(12) United States Patent
Apte et al.

(10) Patent No.: US 7,697,489 B1
(45) Date of Patent: Apr. 13, 2010

(54) METHOD AND SYSTEM FOR TIMER-BASED MOBILE IP RE-REGISTRATION IN A WIRELESS WIDE AREA NETWORK

(75) Inventors: Abhijit V. Apte, Overland Park, KS (US); Hector M. Ribas, Overland Park, KS (US); Ryan S. Talley, Olathe, KS (US); Meng Y. Yew, Lenexa, KS (US); E. Michael Shafer, II, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1333 days.

(21) Appl. No.: 10/889,396

(22) Filed: Jul. 12, 2004

(51) Int. Cl.
*H04W 4/00* (2009.01)

(52) U.S. Cl. ............ 370/338; 370/331; 370/328; 370/352; 455/442; 455/41.2; 455/435.2; 455/445

(58) Field of Classification Search ...... 455/432.1–444, 455/436–437, 435.1; 370/338, 328–334
See application file for complete search history.

(56) References Cited

U.S. PATENT DOCUMENTS

| | | | | |
|---|---|---|---|---|
| 6,195,705 | B1* | 2/2001 | Leung | 709/245 |
| 6,430,395 | B2* | 8/2002 | Arazi et al. | 455/41.2 |
| 6,434,134 | B1* | 8/2002 | La Porta et al. | 370/338 |
| 6,501,746 | B1* | 12/2002 | Leung | 370/338 |
| 6,651,105 | B1* | 11/2003 | Bhagwat et al. | 709/239 |
| 6,725,044 | B2* | 4/2004 | Verma et al. | 455/444 |
| 6,826,154 | B2* | 11/2004 | Subbiah et al. | 370/236 |
| 6,859,651 | B2* | 2/2005 | Gabor | 455/411 |
| 6,978,137 | B2* | 12/2005 | Gwon et al. | 455/436 |
| 6,992,995 | B2* | 1/2006 | Agrawal et al. | 370/328 |
| 7,133,386 | B2* | 11/2006 | Holur et al. | 370/331 |
| 7,162,236 | B2* | 1/2007 | Dorenbosch et al. | 455/432.1 |
| 7,260,399 | B1* | 8/2007 | Oh et al. | 455/436 |
| 7,280,505 | B2* | 10/2007 | Chaskar et al. | 370/331 |
| 7,317,709 | B2* | 1/2008 | Jang et al. | 370/331 |
| 7,356,015 | B2* | 4/2008 | Ibe et al. | 370/338 |
| 7,613,142 | B2* | 11/2009 | Molteni et al. | 370/328 |
| 2002/0049059 | A1* | 4/2002 | Soininen et al. | 455/439 |
| 2002/0057658 | A1* | 5/2002 | Lim | 370/331 |
| 2002/0068570 | A1* | 6/2002 | Abrol et al. | 455/438 |
| 2002/0191627 | A1* | 12/2002 | Subbiah et al. | 370/428 |
| 2003/0053431 | A1* | 3/2003 | Madour | 370/331 |
| 2003/0119506 | A1* | 6/2003 | Singhai et al. | 455/435 |
| 2004/0022212 | A1* | 2/2004 | Chowdhury et al. | 370/329 |
| 2004/0151148 | A1* | 8/2004 | Yahagi | 370/338 |
| 2004/0165563 | A1* | 8/2004 | Hsu et al. | 370/338 |
| 2004/0203788 | A1* | 10/2004 | Fors et al. | 455/439 |

(Continued)

OTHER PUBLICATIONS

C. Perkins, "IP Mobility Support," Request for Comments 2002, Oct. 1996.

*Primary Examiner*—Sharad Rampuria (57) ABSTRACT

A network access server, such as a PDSN, might provide Mobile IP services to one or more access points for a wireless wide area network. A wireless device might handoff to an access point served by the network access server, and the wireless device might receive from the access point an identifier, such as a Packet Zone ID, that identifies the network access server. The wireless device might then register with the access server but delay making any subsequent Mobile IP re-registrations until after a predetermined amount of time.

20 Claims, 6 Drawing Sheets

U.S. PATENT DOCUMENTS

2004/0208144 A1* 10/2004 Vinayakray-Jani .......... 370/331
2004/0260831 A1* 12/2004 Dyck et al. ................ 709/233
2005/0053034 A1* 3/2005 Chiueh ....................... 370/331

* cited by examiner

METHOD AND SYSTEM FOR TIMER-BASED MOBILE IP RE-REGISTRATION IN A WIRELESS WIDE AREA NETWORK

FIELD OF THE INVENTION

This invention relates generally to wireless wide area networks and Mobile IP. More specifically, it relates to a method and system for Mobile IP registration by wireless devices handing off between access points in a wireless wide area network.

BACKGROUND OF THE INVENTION

A wireless device may access a wireless wide area network ("WWAN") that provides voice, data or other services to the wireless device. The WWAN may include multiple access points throughout its coverage area, which allow a wireless device to travel among different physical locations while still remaining within the coverage area of the WWAN. As a wireless devices changes locations it might remain within the coverage area of the WWAN but move from a portion of the WWAN served by one access point to another portion of the WWAN served by another access point.

As the wireless device moves out of range of one access point and into range of another access point, the wireless device might handoff between the access points. For example, the WWAN might be a wireless telecommunications network, and the access points might be base transceiver stations ("BTSs"). In this case, the wireless device might handoff among different BTSs as it moves throughout the coverage area of the wireless telecommunications network. Various different types of handoffs, such as hard or soft handoffs, are possible depending on the particular type of WWAN.

The Internet Protocol ("IP") is one protocol the wireless device might use when accessing the WWAN and communicating with one or more entities on the WWAN or on another network via the WWAN. IP defines an addressing system in which a wireless device might be assigned a unique address that can be used to route data packets to and from that wireless device. That is, the IP address can be a globally routable address. A given IP address, however, is typically associated with a specific IP sub-network, which is a logical network defined for routing IP packets to their assigned devices.

As the wireless device moves among different access points in the WWAN, the wireless device might move among different IP sub-networks. Mobile IP is an extension of IP that allows a wireless device to roam among different IP sub-networks while still receiving packets addressed to its assigned IP address. That is, even though the wireless device might move to an IP sub-network that is different from the IP sub-network for its IP address, the wireless device can continue to use that IP address and to receive packets addressed to the IP address.

Usually an IP sub-network is served by a network access server ("NAS"), which can provide Mobile IP services to wireless devices on the IP sub-network. In some WWANs, the network access server might be a packet data serving node ("PDSN"); however, other types of network access servers might be used, and the particular type of network access server used might vary depending on the particular type of WWAN.

In Mobile IP terminology, a network access server might serve as both a "foreign agent" ("FA") and a "home agent" ("HA") to wireless devices, although this functionality might be distributed among one or more other entities. It is a home agent with respect to wireless devices having IP addresses on its IP sub-network, while it is a foreign agent with respect to wireless devices having IP addresses on different IP sub-networks.

As a home agent, a NAS can receive packets addressed to a wireless device that has its IP address on the same IP sub-network as the home agent. When the wireless device is on its home IP sub-network, the home agent can forward the packets directly to the wireless device on its home IP sub-network. When the wireless device has roamed away from its home IP sub-network to a foreign IP sub-network, the home agent can forward the packets to a NAS acting as a foreign agent for the wireless device on the foreign IP sub-network.

As a foreign agent, a NAS can receive a registration from a wireless device that has roamed away from its home IP sub-network to the foreign IP sub-network of the foreign agent. The foreign agent can in turn notify the wireless device's home agent of the wireless device's current location on the foreign IP sub-network. Packets addressed to the wireless device may then first be routed to its home agent, which in turn uses the registration to determine that the packets should be forwarded to the foreign agent. The foreign agent receives the packets and then sends them to the wireless device's current location on the foreign IP sub-network.

A wireless device might change locations, thereby moving among one or more different IP sub-networks. One of the IP sub-networks might be served by a HA for the wireless device, and the other IP sub-networks might be served by respective FAs for the wireless device. As the wireless device moves among these IP sub-networks, it can alter is registration with its home agent or a foreign agent. For example, the wireless device might currently be registered with a first foreign agent on a first IP sub-network. The wireless device might the move to a second IP sub-network, which is served by a second foreign agent.

The wireless device might detect the presence of the second foreign agent in a variety of different ways. The wireless device might receive from the second foreign agent an agent advertisement message, which foreign and home agents can periodically transmit in order to signal their presence to wireless devices. Alternatively, the wireless device might transmit an agent solicitation message and in turn receive a response from an available home or foreign agent, such as the second foreign agent. Other methods might also be used.

After detecting the second foreign agent, the wireless device might initiate a Mobile IP re-registration with the second foreign agent. That is, instead of continuing its registration with the first foreign agent, the wireless device might switch its registration to the second foreign agent. Thus, re-registration can refer to the process of switching from being registered with one agent (e.g., either a FA or a HA) to being registered with another agent. During re-registration, the second foreign agent can notify the wireless device's home agent of its new location. The home agent then begins forwarding packets for the wireless device to the second foreign agent instead of the first foreign agent.

In the WWAN, multiple access points might be served by a single NAS. Thus, the access points might all be on the same IP sub-network. A wireless device moving among these different access points might then remain on the same IP sub-network, and therefore it would not need to update its Mobile IP registration with a different NAS as it roamed among these access points. When the wireless device eventually hands off to an access point served by a different NAS, the wireless device would then need to update its Mobile IP registration with the new NAS. This re-registration typically occurs regardless of whether the wireless device is currently participating in a Mobile IP session.

In some instances, the wireless device might be located at a boundary between areas served by different access points. The access points might be located on different IP sub-networks and served by different NASs. When the wireless device is located at this boundary, whether the wireless device is stationary or moving, it might handoff back and forth between the two access points in a sort of ping pong effect. For example, the relative signal strengths of the RF signal received from the access points, or other factors used in determining whether to initiate a handoff, might be approximately equal.

Small changes in the location of the wireless device, variations in atmospheric conditions, other a variety of other effects might cause corresponding slight changes in the relative signal strengths of the access points. And, these effects might continuously, although possibly only slightly, alter the relative signal strengths of the RF signal received from the access points as detected by the wireless device. Since the signal strengths might be approximately equal, these small changes might cause the two signals, within a relatively short period of time, to oscillate back and forth around a point set to trigger the wireless device to handoff between the access points. Each handoff might in turn each cause the wireless device to initiate a Mobile IP re-registration with a NAS for the respective access point currently serving the wireless device. These re-registrations might consume WWAN resources, consume battery power in the wireless device or have other adverse effects.

Therefore, there exists a need for an improved method and system for Mobile IP registration by wireless devices handing off between access points in a WWAN.

SUMMARY OF THE INVENTION

A wireless device might handoff to a first access point in a wireless wide area network. As part of the handoff, the wireless device might receive an identifier from the access point that identifies a first network access server providing Mobile IP services to wireless devices being served by the first access point. After initiating a registration with the first network access server, the wireless device might thereafter wait a predetermined amount of time before making any subsequent Mobile IP registrations with other network access servers.

For example, the wireless device might handoff to a second access point served by a second network access server providing Mobile IP services to wireless devices being served by the second network access server. The wireless device might then determine that the predetermined amount of time after its registration with the first network access server has not passed and therefore continue its registration with the first network access server rather than re-registering with the second network access server.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

I. Overview

Figure 1:
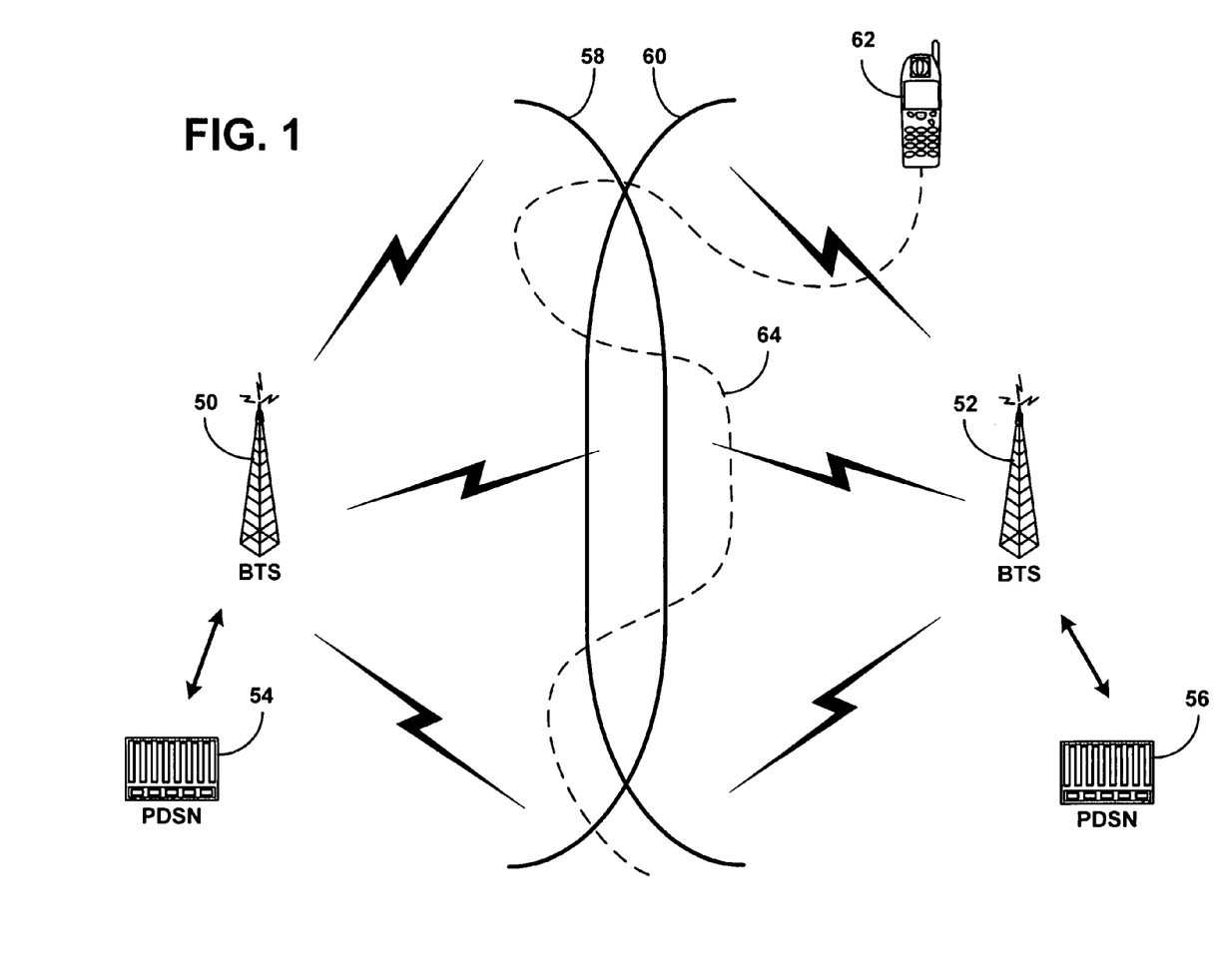
FIG. 1 is a block diagram of an exemplary system implementing Mobile IP registration using re-registration timers in a WWAN.

FIG. 1 is a block diagram of an exemplary system implementing Mobile IP registration using re-registration timers in a WWAN. The WWAN includes a first base transceiver station ("BTS") 50 and a second BTS 52, although the WWAN might alternatively use other types of access points. The first BTS 50 might interface with a first PDSN 54, and the second BTS 52 might interface with a second PDSN 56. The two PDSNs might provide Mobile IP services to their respective BTSs, but the WWAN might alternatively use network access servers other than PDSNs to provide these services. In this exemplary configuration, the first BTS 50 is on one IP sub-network, and the second BTS 52 is on another IP sub-network.

The first BTS 50 generally serves a particular sector of the WWAN. Wireless devices within range of the first BTS 50 can then communicate with the first BTS 50 in order to access the WWAN. Similarly, wireless devices within range of the second BTS 52 can communicate with the second BTS 52 in order to access the WWAN. FIG. 1 generally depicts a first partial boundary 58 for the first BTS 50 and a second partial boundary 60 for the second BTS 52. The partial boundaries 58, 60 might approximately represent the distance from the access point at which wireless devices move in and out of the range of the access point. At these partial boundaries 58, 60, a wireless device might handoff from one BTS to the other BTS depending on the relative signal strengths of the RF signal received from the first and second BTSs 50, 52 or a variety of other factors.

A wireless device 62 handing off to a new BTS might receive from that new BTS an identifier, such as a Packet Zone ID, that identifies a particular PDSN associated with the new BTS. For example, the wireless device 62 might handoff from the first BTS 50 to the second BTS 52. It might receive from the second BTS 52 a Packet Zone ID that identifies the second PDSN 56 and then register with the second PDSN 56. In addition to receiving the Packet Zone ID, the wireless device 62 might also receive from the second BTS 52 a timer value that it can use to delay making any subsequent Mobile IP re-registrations by an amount of time indicated by the timer value.

The wireless device 62 might then handoff back to the first BTS 50, and the wireless device 62 might receive from the first BTS 50 a Packet Zone ID that identifies the first PDSN 54. Handing off to a new BTS and receiving a Packet Zone ID that identifies that the wireless device's new BTS is associated with a different PDSN than the wireless device's previous BTS might ordinarily cause the wireless device 62 to initiate a Mobile IP re-registration with the PDSN for its new BTS. However, this might not occur if the wireless device 62 uses timer-based re-registrations. That is, the wireless device 62 might determine that the timer has not yet expired, and therefore it might not initiate a re-registration with the first PDSN 54. If the wireless device 62 subsequently hands off back to the second BTS 52, it would not need to re-register with the second PDSN 56.

Several of these back and forth handoffs might occur before the expiration of a timer corresponding to the timer value. For example, FIG. 1 depicts an exemplary travel path 64 for the wireless device 62 as it moves along the partial boundaries 58, 60, and this travel path 64 might result in several handoffs of the wireless device 62 between the first BTS 50 and the second BTS 52. For each handoff, the wireless device 62 would receive the Packet Zone ID for the new BTS. Until the timer expires, however, these back and forth handoffs would not result in corresponding Mobile IP re-registrations.

This might conserve network resources, battery power in the wireless device 62 or have other advantages. After the timer expires, the wireless device 62 might check the most recent Packet Zone ID that it received. If it is different than the Packet Zone ID for its current Mobile IP registration, the wireless device 62 might then initiate a re-registration for this new Packet Zone ID. Otherwise, the wireless device 62 might wait until it makes a subsequent handoff that results in receiving a Packet Zone ID different than that of its current Mobile IP registration before initiating a re-registration.

II. Exemplary Architecture

Figure 2:
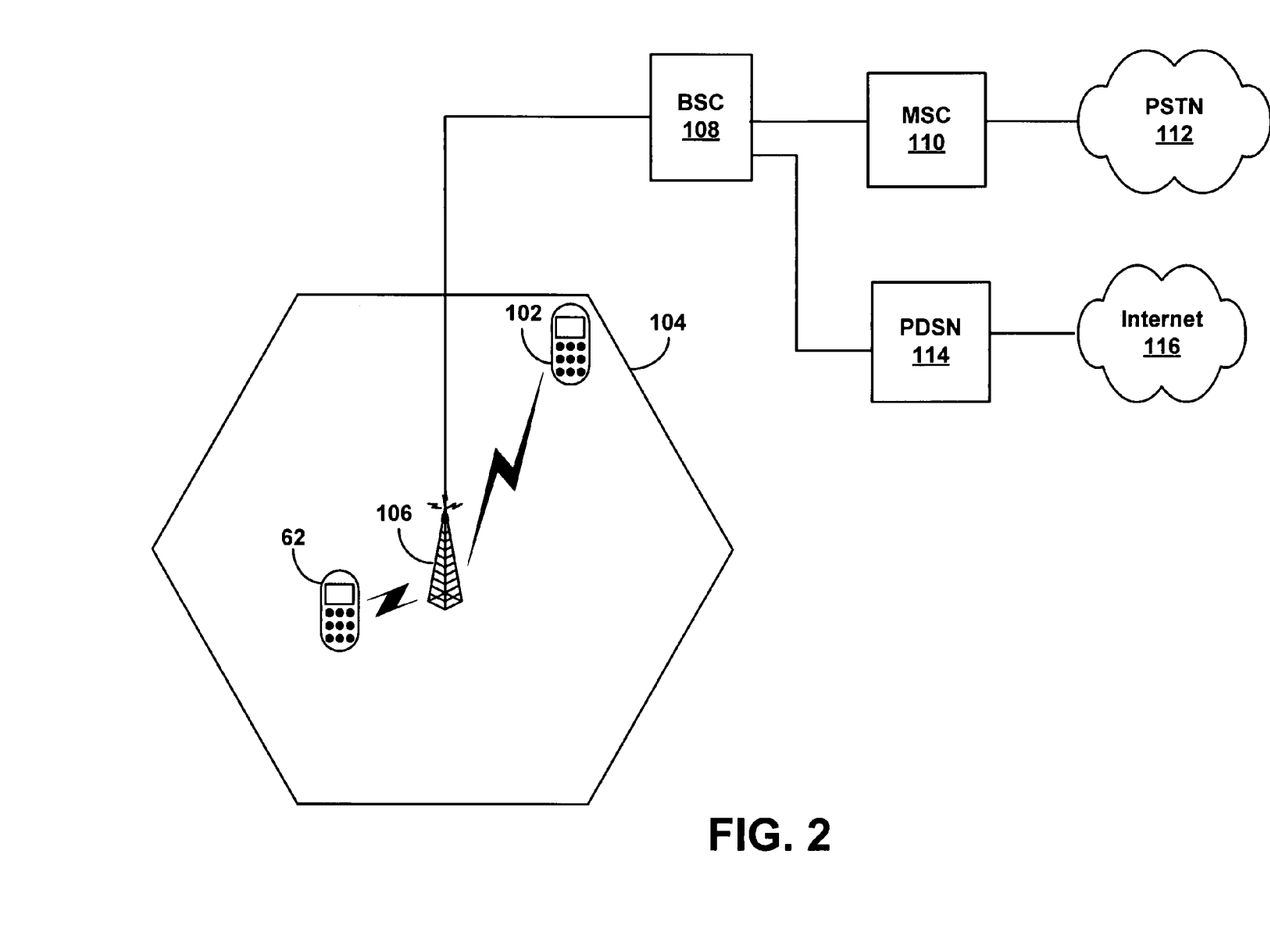
FIG. 2 shows an exemplary architecture for a WWAN, such as can be used to implement timer-based re-registration for wireless devices handing off between access points.

FIG. 2 shows an exemplary architecture for a WWAN, such as can be used to implement timer-based re-registration for wireless devices handing off between access points. As depicted in FIG. 2, a first wireless device 62 and a second wireless device 102 are located within a sector 104 of the wireless network. The wireless devices 62, 102 may be any type of wireless device, such as a mobile phone, a personal digital assistant ("PDA"), a two-way pager, a two-way radio, a wirelessly equipped computer or another wireless device. While FIG. 2 depicts two wireless devices 62, 102 within the sector 104, the sector 104 may include a greater or fewer number of wireless devices. Also, it is not necessary that the wireless devices all be the same type of wireless device.

The WWAN includes many different sectors, each of which might be served by a respective access point. However, one sector might alternatively be served by more than one access point. The access points may provide wireless devices with connectivity to the WWAN, which the wireless devices can use to obtain voice and/or data services. The particular division of the WWAN into sectors and the number and arrangements of access points might vary with the particular WWAN implementation.

As depicted in FIG. 2, the wireless devices 62, 102 communicate with a base transceiver station ("BTS") 106 through an air interface. The wireless devices 62, 102 might communicate with the BTS 106 via the air interface using a variety of different protocols. In one exemplary embodiment, the wireless devices 62, 102 communicate with the BTS 106 using Code Division Multiple Access ("CDMA"), such as in a CDMA2000 3G packet data network. CDMA provides a method for the wireless devices 62, 102 and the BTS 106 to communicate over a spread spectrum of frequencies.

CDMA is described in further detail in Telecommunications Industry Association ("TIA") standards IS-95A and IS-95B. CDMA is also described in the International Telecommunications Union ("ITU") IMT-2000 series of standards. CDMA is further described in the TIA IS-2000 series of standards. The IS-2000 series of standards are commonly referred to as CDMA2000.

Other protocols might also be used. For example, the wireless devices 62, 102 and the BTS 106 might alternatively use Wideband CDMA ("WCDMA"), Time Division Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), General Packet Radio Services ("GPRS"), IS-136, Time Division Multiple Access ("TDMA"), Frequency Division Multiple Access ("FDMA") or other protocols. Additional wireless protocols, such any of the variety of protocols under the Institute of Electrical and Electronics Engineers ("IEEE") 802.11 umbrella, Bluetooth or others might also be used.

The BTS 106 couples to a base station controller ("BSC") 108, which can perform various functions such as managing handoffs of the wireless devices 62, 102 as they move among different BTSs. The BSC 108 may in turn connect to a mobile switching center ("MSC") 110. The MSC 110 can manage setup and teardown of connections with the wireless devices 62, 102. While the BSC 108 and the MSC 110 are depicted as separate components, their functionality might also be combined into a single component.

The MSC 110 can additionally provide connectivity to the public switched telephone network ("PSTN") 112. Using this connectivity, the wireless devices 62, 102 might communicate with other devices that are also connected to the PSTN 112. For example, the wireless devices 62, 102 might form circuit switched connections with other devices on the PSTN 112 and then exchange voice and/or data traffic over those circuit switched connections.

In addition to connecting to the MSC 110, the BSC 108 might also connect with a packet data serving node ("PDSN") 114. The PDSN 114 may in turn provide connectivity to a packet data network, such as the Internet 116, an intranet or another packet data network. The wireless devices 62, 102 can use this connectivity to engage in packet data communications with other devices, and the wireless devices might use a variety of different protocols to engage in data communications with these other devices.

When connecting to the WWAN for data services, the wireless devices 62, 102 might establish a Point-to-Point Protocol ("PPP") session with the PDSN 114. While the wireless devices 62, 102 might communicate with the PDSN 114 through a PPP session, they might also use other higher and lower level protocols to communicate with the PDSN 114 and ultimately with other devices. For example, the wireless devices 62, 102 might use Internet Protocol ("IP"), Mobile IP, Transmission Control Protocol ("TCP"), User Datagram Protocol ("UDP") or other protocols.

PPP is described in more detail in Internet Engineering Task Force ("IETF") Request for Comments ("RFCs") 1661, 1662 and 1663. IP is described in more detail in IETF RFC 791. Mobile IP is described in detail in the Internet Engineering Task Force Request for Comment 2002, C. Perkins, October 1996. TCP is described in more detail in IETF RFC 793. UPD is described in further detail in IETF RFC 768.

The BTS 106 might store a Packet Zone ID or some other identifier for the PDSN 114 providing it Mobile IP services. When the wireless device 62 then participates in a handoff to the BTS 106, it provides the wireless device 62 with that Packet Zone ID. The BTS 106 might send the Packet Zone ID to the wireless device 62 via a paging channel or a forward traffic channel; however, other channels might also be used.

The BTS 106 can also provide the wireless device 62 with a timer value, which the BTS 106 can obtain in a variety of different ways. For example, the timer value might be defined in the BTS 106. Alternatively, the timer value might be defined in the PDSN 114, which can in turn provide the timer value to the BTS 106. Still alternatively, the timer value might be specified at a centralized BSC ("CBSC") that serves multiple BTSs. These are merely examples, and the timer value might alternatively be specified at other elements in the WWAN. Different centralized elements might use different timer values. For example, the first and second PDSNs 54, 56 might use different timer values for their respective BTSs.

Defining the timer value in a centralized element, such as at a PDSN or CBSC, might conveniently allow the timer value to be changed at the single location while still having the change propagate through to multiple BTSs served by the centralized element. The timer value might be provided from the centralized element to the BTSs in a variety of different ways. For example, the centralized element might periodically transmit the timer value to the BTSs. In another example, the centralized element might initially transmit the timer value to the BTSs. Rather than periodically re-transmitting the timer value to the BTSs, the centralized element might only re-transmit the timer value to the BTSs after a change is made to the timer value. In yet another example, the BTSs might periodically request the timer value from the centralized element, which can provide the BTSs with the timer value in response to the requests. These are only examples, and other methods are also possible.

The timer value might itself be a number of seconds, minutes, hours or some other time measure. Alternatively, the timer value might itself be a code that indicates which of one or more pre-specified amounts of time to use. The pre-specified amounts of time might be programmed into the wireless device 62 or otherwise provided to the wireless device 62. After the wireless device 62 receives the timer value that itself is a code, the wireless device 62 can then determine the amount of time corresponding to the code.

For example, the wireless device 62 might store four pre-specified amounts of time. These pre-specified amounts of time might be pre-programmed into the wireless device. In some embodiments, the pre-specified amounts of time might be alterable by a user of the wireless device, while in other embodiments they might not be alterable by a user of the wireless device. The timer value might simply indicate which of the four pre-specified amounts of time to use. Other methods might also be used to determine the amount of time corresponding to a given timer value.

The timer value might correspond to any amount of time, and in a preferred embodiment the timer value corresponds to approximately two minutes. Many different factors might be used to determine the timer values. For example, the morphology of the WWAN might be used to determine the timer values. If the partial boundaries 58, 60 fall along a highway or other road where wireless devices might be moving more rapidly and therefore potentially changing locations more quickly, then the timer value might be set to correspond to a smaller amount of time. However, if the partial boundaries 58, 60 correspond to a residential neighborhood, a downtown area or some other location where wireless devices might not be moving more rapidly and therefore possibly not changing locations as quickly, the timer value might be set to correspond to a greater amount of time.

Also, different timer values might be used throughout the WWAN. For example, a PDSN might store different timer values that respectively correspond to different BTSs being provided Mobile IP services by the PDSN. Where the timer values are specified in a CBSC or some other element, that element might similarly store different timer values that respectively correspond to different BTSs. These centralized elements might then provide the different timer values to their corresponding BTSs, such as upon changes to the timer values, requests from BTSs or other events.

III. Exemplary Operation

Figure 3:
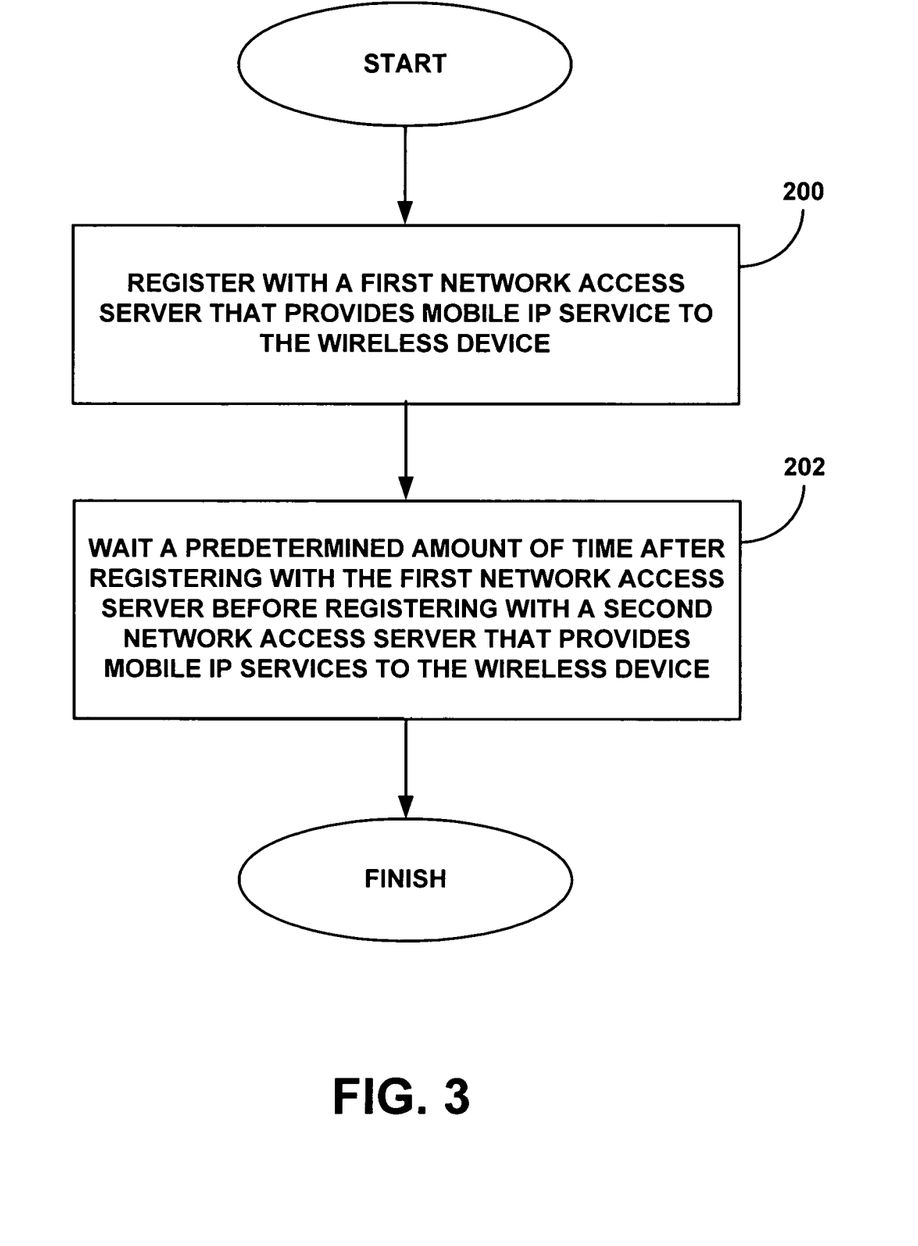
FIG. 3 is a flowchart depicting an exemplary method for Mobile IP registration by a wireless device on a wireless wide area network.

FIG. 3 is a flowchart depicting an exemplary method for Mobile IP registration by a wireless device on a wireless wide area network. At Step 200, the wireless device registers with a first network access server that provides Mobile IP service to the wireless device. The first network access server might be, for example, a PDSN. However, it might alternatively be another type of network access server. At Step 202, the wireless device waits a predetermined amount of time after registering with the first network access server before registering with a second network access server that provides Mobile IP services to the wireless device.

For example, after registering with the first network access server, the wireless device might handoff to one or more access points that are served by respective network access servers other than the first network access server. These other network access servers might provide Mobile IP services to wireless devices being served by their respective access points. However, if the predetermined amount of time has not expired, the wireless device might continue its registration with the first network access server rather than initiating a re-registration with any of these other network access servers.

Figure 4:
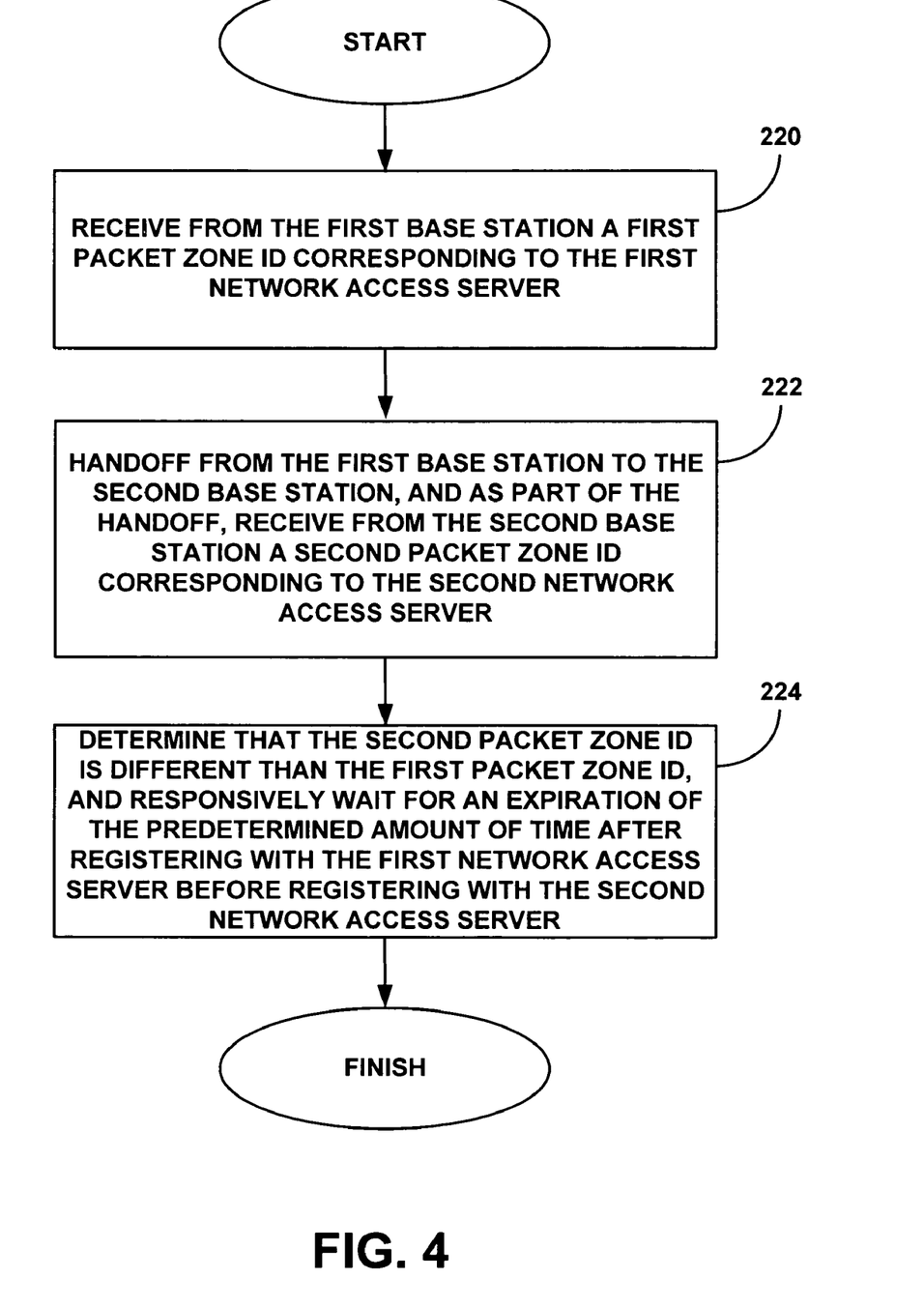
FIG. 4 is a flowchart depicting an exemplary method that can be used for a wireless device to wait a predetermined amount of time before re-registering with a network access server.

FIG. 4 is a flowchart depicting an exemplary method that can be used for a wireless device to wait a predetermined amount of time before re-registering with a network access server. This method might be used in conjunction with the method of FIG. 3. In this method, the first network access server might serve at least a first base station, and the second network access server might serve at least a second base station.

At Step 220, the wireless device receives from the first base station a first packet zone ID corresponding to the first network access server. At Step 222, the wireless device hands off from the first base station to a second base station, and as part of the handoff, receives from the second base station a second packet zone ID corresponding to the second network access server. At Step 224, the wireless device determines that the second packet zone ID is different than the first packet zone ID, and responsively waits for an expiration of the predetermined amount of time after registering with the first network access server before registering with the second network access server.

Figure 5:
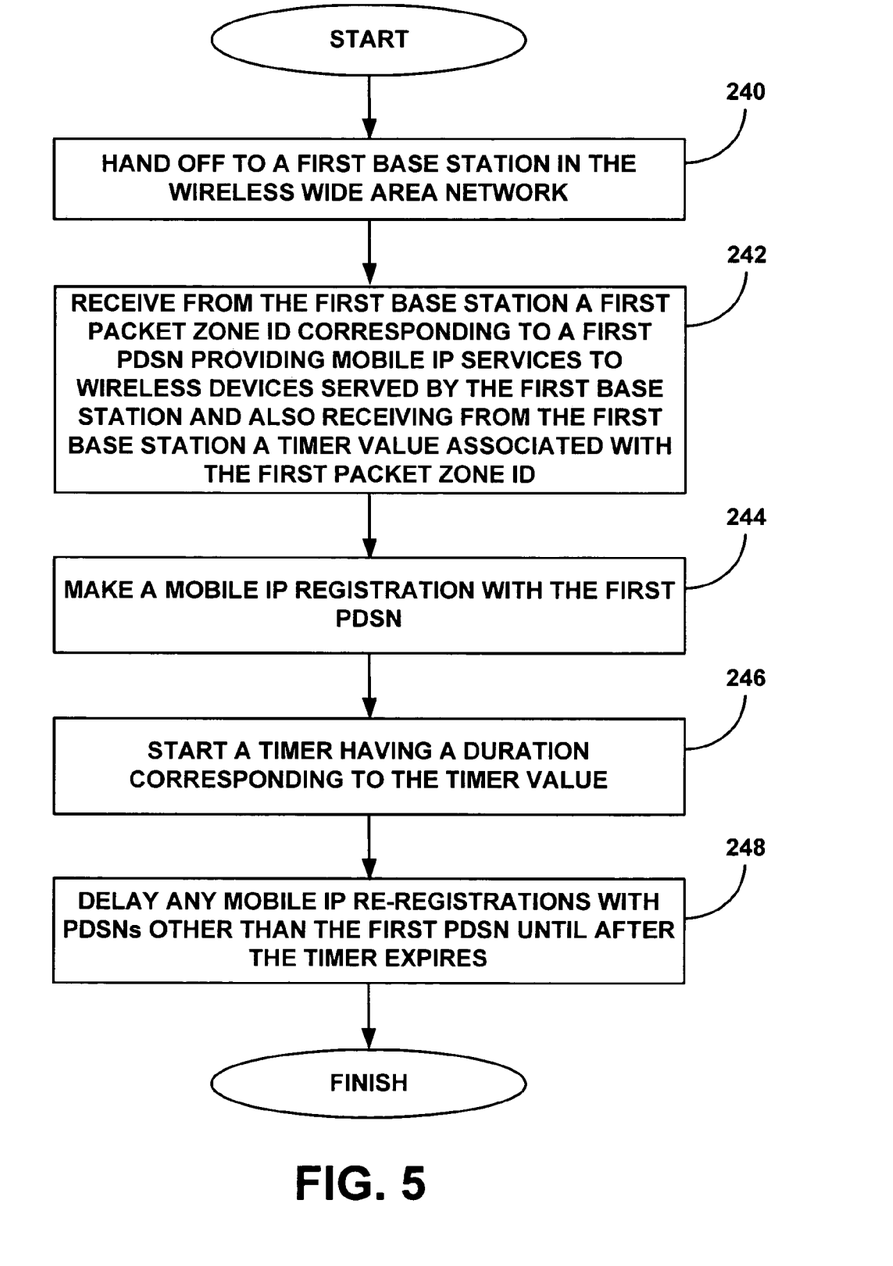
FIG. 5 is a flowchart depicting an exemplary method for a wireless device handing off between base stations in a wireless wide area network to register for Mobile IP services.

FIG. 5 is a flowchart depicting an exemplary method for a wireless device handing off between base stations in a wireless wide area network to register for Mobile IP services. At Step 240, the wireless device hands off to a first base station in the wireless wide area network. At Step 242, the wireless devices receives from the first base station a first Packet Zone ID corresponding to a first PDSN providing Mobile IP services to wireless devices served by the first base station and also receives from the first base station a timer value associated with the first packet zone ID.

The wireless device might receive the first Packet Zone ID as part of the handoff process, or the wireless device might alternatively receive the Packet Zone ID before or after it hands off to the first base station. The first base station might provide the first Packet Zone ID to the wireless device, and the first Packet Zone ID might be defined and stored in the first base station. Alternatively, the first base station might obtain the first Packet Zone ID from the first PDSN, a common BSC or some other element before then providing the first Packet Zone ID to the wireless device.

At Step 244, the wireless device makes a Mobile IP registration with the first PDSN. For example, the first PDSN might be acting as a home agent or a foreign agent to the wireless device, and the wireless device might register its presence on the IP sub-network of the PDSN by sending a Mobile IP registration message to the first PDSN. At Step 246, the wireless device starts a timer having a duration corresponding to the timer value. At Step 248, the wireless device delays any Mobile IP re-registrations with PDSNs other than the first PDSN until after the timer expires.

In one exemplary operation, the wireless device 62 might be located at a boundary between first and second access points, such as the first and second base stations 50, 52 of FIG. 1. The wireless device 62 might be stationary at this boundary, or it might be moving around this boundary. The wireless device 62 might initially be served by one of the access points, such as the first base station 50, and the wireless device 62 might also make a Mobile IP registration with a first network access server that corresponds to the first access point, such as the first PDSN 54 that corresponds to the first base station 50.

After making this initial registration, the wireless device 62 might handoff to the second access point. A second network access server rather than the first network access server might correspond to the second access point. For example, the wireless device 62 might handoff from the first base station 50 to the second base station 52, which is served by the second PDSN 56 instead of the first PDSN 54. That is, the first and second access points might be on different IP sub-networks. The wireless device 62 might then handoff back to the first access point. Based on various factors such as changes in the location of the wireless device 62, changes in the relative signal strengths of the RF signal received from the two access points or other factors, the wireless device 62 might undergo several handoffs from the first access point to the second access point and then back to the first access point.

Figure 6:
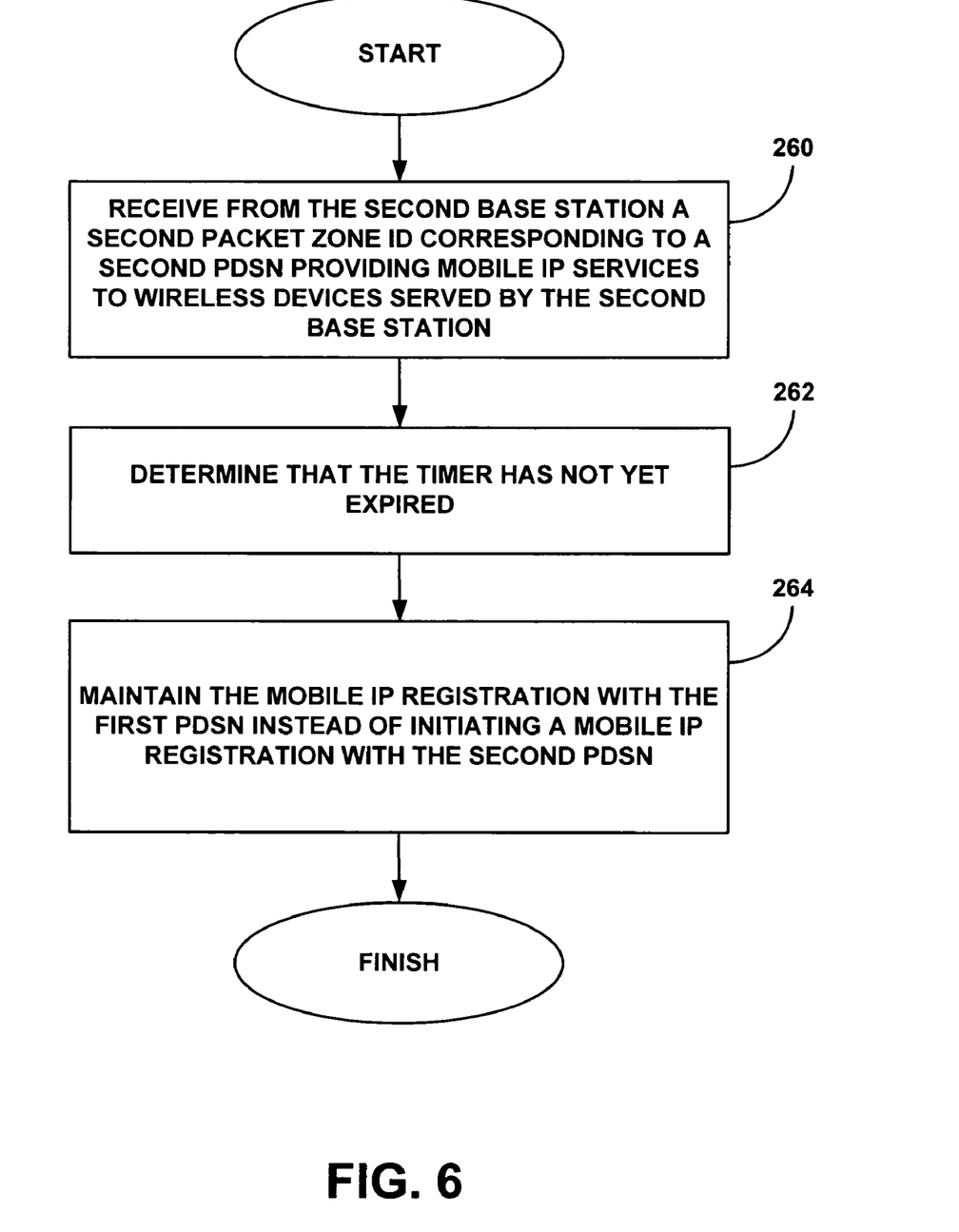
FIG. 6 is a flowchart depicting an exemplary method the wireless device might perform for each handoff to a second base station in a series of handoffs between the first and second base stations where the wireless device has a current Mobile IP registration with a first PDSN corresponding to the first base station.

After the wireless device 62 makes its initial Mobile IP registration with the first network access server, the wireless device 62 might wait a predetermined amount of time before making any subsequent Mobile IP re-registrations with other network access servers. FIG. 6 is a flowchart depicting an exemplary method the wireless device might perform for each handoff to a second base station in a series of handoffs between the first and second base stations where the wireless device has a current Mobile IP registration with a first PDSN corresponding to the first base station.

At Step 260, the wireless device receives from the second base station a second Packet Zone ID corresponding to a second PDSN providing Mobile IP services to wireless devices served by the second base station. The wireless device then determines that the timer for its initial registration with the first network access server corresponding to the first base station has not yet expired, as shown at Step 262. Since the timer has not yet expired, the wireless device then maintains its Mobile IP registration with the first PDSN instead of initiating a Mobile IP re-registration with the second PDSN, as shown at Step 264.

Although the wireless device 62 might undergo multiple handoffs between the first and second base stations 50, 52, the wireless device 62 might maintain its Mobile IP registration with the first PDSN 54 corresponding to the first base station 50. That is, for each handoff to the second base station 52 during the predetermined amount of time after its registration with the first PDSN 54, the wireless device 62 would not re-register with the second PDSN 56. This might advantageously conserve network resources, conserve battery life in the wireless device 62 or have various other advantages.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams. The claims should not be read as limited to the described order or elements unless stated to that effect.

In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for Mobile Internet Protocol (IP) registration by a wireless device on a wireless wide area network, the method comprising:

handing off to a first access point served by a first network access server that provides Mobile IP service;

after handing off to the first access point, registering with the first network access server after registering with the first network access server, handing off to a second access point served by a second network access server that provides Mobile IP service; and after handing off to the second access point, waiting a predetermined amount of time after registering with the first network access server before registering with the second network access server.

2. The method of claim 1, further comprising:

receiving from the first access point a first identifier that identifies the first network access server.

3. The method of claim 1, further comprising receiving from the first access point an indication of the predetermined amount of time.

4. The method of claim 1, wherein the first network access server is a Mobile IP home agent or a foreign agent to the wireless device, and wherein the second network access server is a Mobile IP home agent or a foreign agent to the wireless device.

5. The method of claim 1, wherein the predetermined amount of time is pre-programmed into the wireless device.

6. The method of claim 5, wherein the predetermined amount of time is alterable by a user of the wireless device.

7. The method of claim 1, wherein the first and second network access servers are packet data serving nodes.

8. The method of claim 1, wherein the first network access server provides Mobile IP services to a first logical IP sub-network, and wherein the second network access server provides Mobile IP services to a second logical IP sub-network.

9. The method of claim 1, wherein the wireless wide area network is a wireless telecommunications network, and wherein the wireless device is a mobile phone.

10. The method of claim 1, wherein the first access point is a first base station, and wherein the second access point is a second base station, the method further comprising:
receiving from the first base station a first packet zone identification (ID) corresponding to the first network access server;
as part of the handoff to the second base station, receiving from the second base station a second packet zone ID corresponding to the second network access server; and
determining that the second packet zone ID is different than the first packet zone ID, and responsively waiting for an expiration of the predetermined amount of time after registering with the first network access server before registering with the second network access server.

11. The method of claim 10, wherein receiving from the first base station a first packet zone ID comprises receiving the first packet zone ID from the first base station via a paging channel or a forward traffic channel.

12. A method for a wireless device handing off between base stations in a wireless wide area network to register for Mobile Internet Protocol (IP) services, the method comprising:
handing off to a first base station in the wireless wide area network;
receiving from the first base station a first packet zone identification (ID) corresponding to a first packet data serving node (PDSN) providing Mobile IP services to wireless devices served by the first base station and also receiving a timer value associated with the first packet zone ID;
making a Mobile IP registration with the first PDSN;
starting a timer having a duration corresponding to the timer value; and
delaying any Mobile IP re-registrations with PDSNs other than the first PDSN until after the timer expires.

13. The method of claim 12, wherein delaying any Mobile IP re-registrations with PDSNs other than the first PDSN comprises:
handing off from the first base station to a second base station;
receiving from the second base station a second packet zone ID corresponding to a second PDSN providing Mobile IP services to wireless devices served by the second base station; and
waiting until after the timer expires to initiate a Mobile IP re-registration with the second PDSN.

14. The method of claim 12, wherein delaying any Mobile IP re-registrations with PDSNs other than the first PDSN comprises:
engaging in multiple handoffs between the first base station and a second base station;
for each handoff to the second base station:
receiving from the second base station a second packet zone ID corresponding to a second PDSN providing Mobile IP services to wireless devices served by the second base station;
determining that the timer has not yet expired; and
maintaining the Mobile IP registration with the first PDSN instead of initiating a Mobile IP re-registration with the second PDSN.

15. The method of claim 14, wherein the wireless device maintains an active set of base stations, and wherein the first base station and the second base station are in the active set of base stations during the duration of the timer.

16. The method of claim 14, wherein the multiple handoffs comprise hard handoffs or soft handoffs.

17. The method of claim 12, wherein the first PDSN provides Mobile IP services to wireless devices being served by a plurality of base stations, wherein the plurality of base stations are controlled by a common base station controller, wherein the timer value is defined in the common base station controller, and wherein the timer value is used for first and second wireless devices being served by different base stations in the plurality of base stations.

18. The method of claim 12, wherein the first PDSN provides Mobile IP services to wireless devices being served by a plurality of base stations, and wherein each base station stores a respective timer value to be used by wireless devices being served by the base station.

19. A wireless device comprising:
a processor;
memory;
logic stored in the memory and executable by the processor to i) handoff to a first base station in a wireless wide area network, ii) receive from a first base station a first packet zone identification (ID) corresponding to a first packet data serving node (PDSN) providing Mobile Internet Protocol (IP) services to wireless devices served by the first base station and a timer value associated with the first packet zone ID, iii) initiate a Mobile IP registration with the first PDSN, iv) start a timer having a duration corresponding to the timer value, and v) wait until the timer expires before initiating a Mobile IP re-registration with a PDSN other than the first PDSN.

20. The wireless device of claim 19, further comprising logic stored in the memory and executable by the processor to i) handoff from the first base station to a second base station in the wireless wide area network, ii) receive from the second base station a second packet zone ID corresponding to a second PDSN providing Mobile IP services wireless devices being served by the second base station, iii) initiate a Mobile IP registration with the second PDSN if the timer has expired, and iv) maintain the Mobile IP registration with the first PDSN if the timer has not expired.

* * * * *